(12) United States Patent
Piantanida et al.

(10) Patent No.: US 8,828,168 B2
(45) Date of Patent: Sep. 9, 2014

(54) METHOD OF CONTROLLING A PHASE OF MOULDING AN ANNULAR FIXING STRUCTURE AND A TYRE INCLUDING AN ANNULAR FIXING STRUCTURE

(75) Inventors: Pier Giuseppe Piantanida, Milan (IT); Gianni Mancini, Milan (IT); Gaetano Lo Presti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 429 days.

(21) Appl. No.: 13/057,253

(22) PCT Filed: Aug. 4, 2009

(86) PCT No.: PCT/IB2009/006434
§ 371 (c)(1),
(2), (4) Date: Feb. 2, 2011

(87) PCT Pub. No.: WO2010/015910
PCT Pub. Date: Feb. 11, 2010

(65) Prior Publication Data
US 2011/0132515 A1    Jun. 9, 2011

(51) Int. Cl.
*B29D 30/06*    (2006.01)
*B29C 51/28*    (2006.01)

(52) U.S. Cl.
USPC .................... 156/110.1; 156/245; 264/501

(58) Field of Classification Search
None
See application file for complete search history.

(56) References Cited

U.S. PATENT DOCUMENTS 2,997,740 A    8/1961 Soderquist
4,545,750 A  * 10/1985 Sarumaru ...................... 425/32
4,743,322 A  *  5/1988 Holroyd et al. ............... 156/123
4,758,401 A      7/1988 Rach et al.
4,865,532 A      9/1989 Frerichs et al.
5,127,811 A      7/1992 Trethowan (Continued)

FOREIGN PATENT DOCUMENTS

EP    0 368 546 A1    5/1990
EP    0 976 532 A1    2/2000

(Continued)

OTHER PUBLICATIONS

International Search Report from the European Patent Office for International Application No. PCT/IB2009/006434, mailing date Feb. 4, 2010.

*Primary Examiner* — Justin Fischer
(74) *Attorney, Agent, or Firm* — Finnegan, Henderson, Farabow, Garrett & Dunner, L.L.P.

(57) ABSTRACT

A method for controlling a phase of molding an annular fixing structure of a green tire includes: introducing the green tire into a curing mold including an inflatable bladder; delimiting at least one portion of the annular fixing structure by using a first and a second surface opposed to each other; bringing the first surface and the second surface so as to bring a portion of the first surface and a portion of the second surface into contact with a corresponding radially inner and axially inner surface portion and a corresponding radially inner and axially outer surface portion, respectively, the annular fixing structure generating a first squeezing pressure; inflating the inflatable bladder of the curing mould so as to bring the first and the second surfaces closer together, thus generating a second squeezing pressure in such a way as to shape the radially inner and axially inner surface portions and the radially inner and axially outer surface portions of the annular fixing structure.

14 Claims, 15 Drawing Sheets

(56) References Cited

U.S. PATENT DOCUMENTS

| | | |
|---|---|---|
| 2003/0141627 A1 | 7/2003 | Girard et al. |
| 2008/0128947 A1 | 6/2008 | Sakamoto |
| 2009/0174122 A1 | 7/2009 | Mancini |
| 2009/0211695 A1 | 8/2009 | Marchini et al. |

FOREIGN PATENT DOCUMENTS

| | | |
|---|---|---|
| WO | WO 00/35666 | 6/2000 |
| WO | WO 2007/063560 A1 | 6/2007 |
| WO | WO 2008/007400 A1 | 1/2008 |
| WO | WO 2010/016073 A1 | 2/2010 |

* cited by examiner

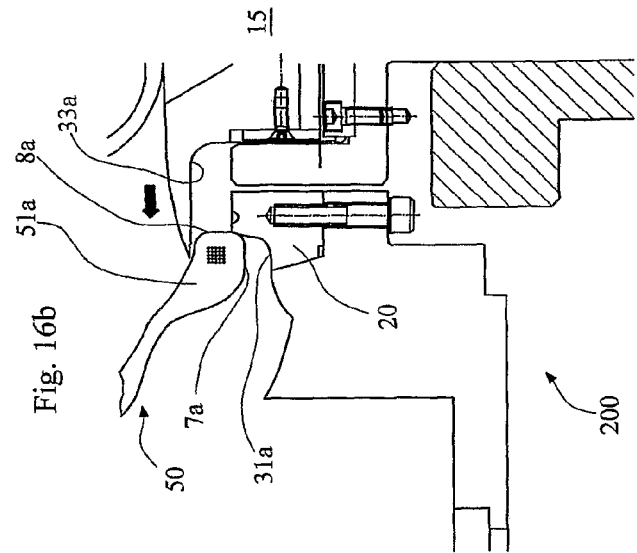
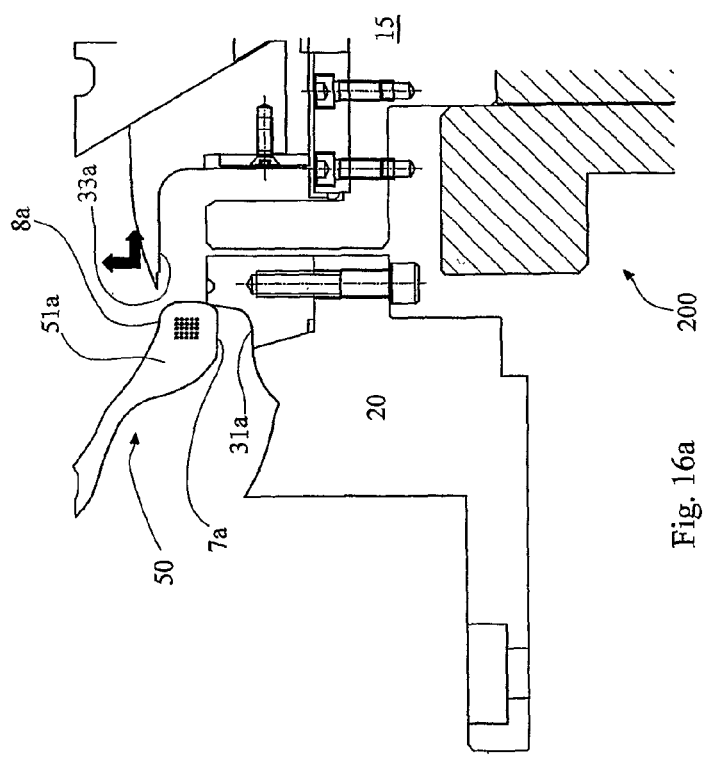

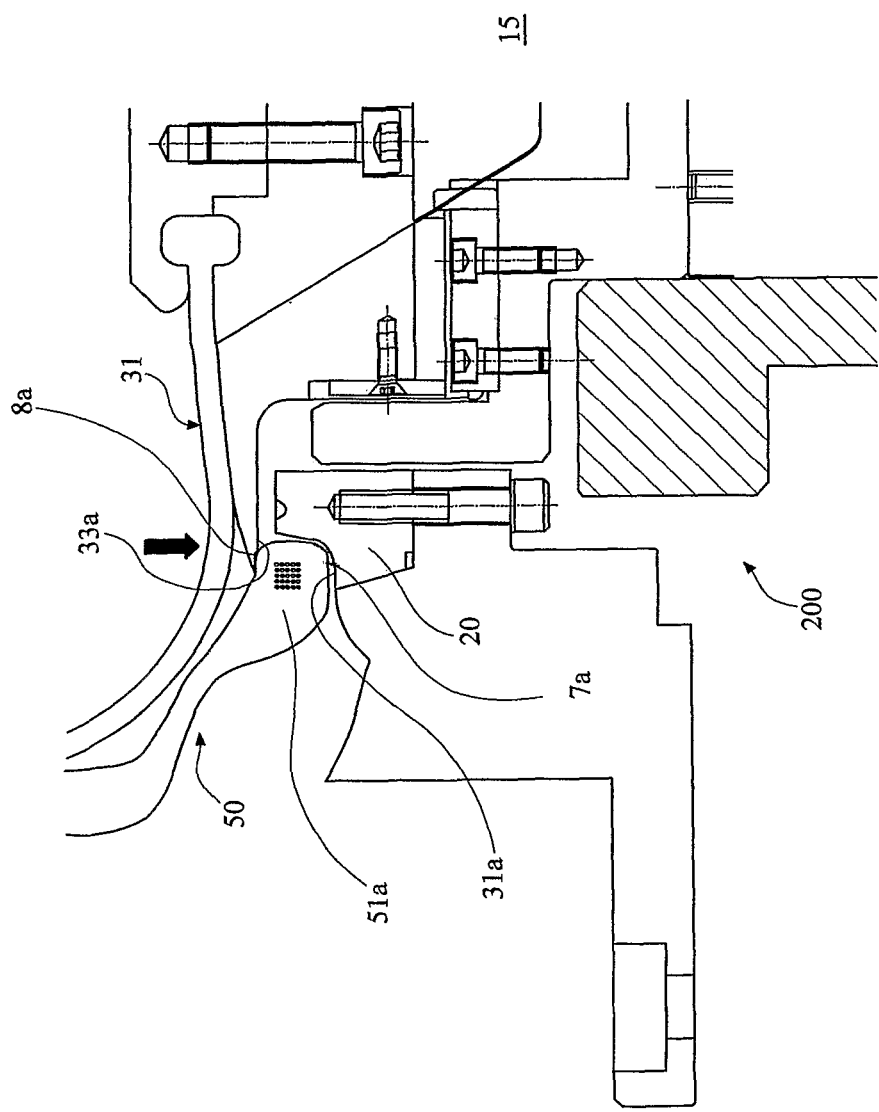

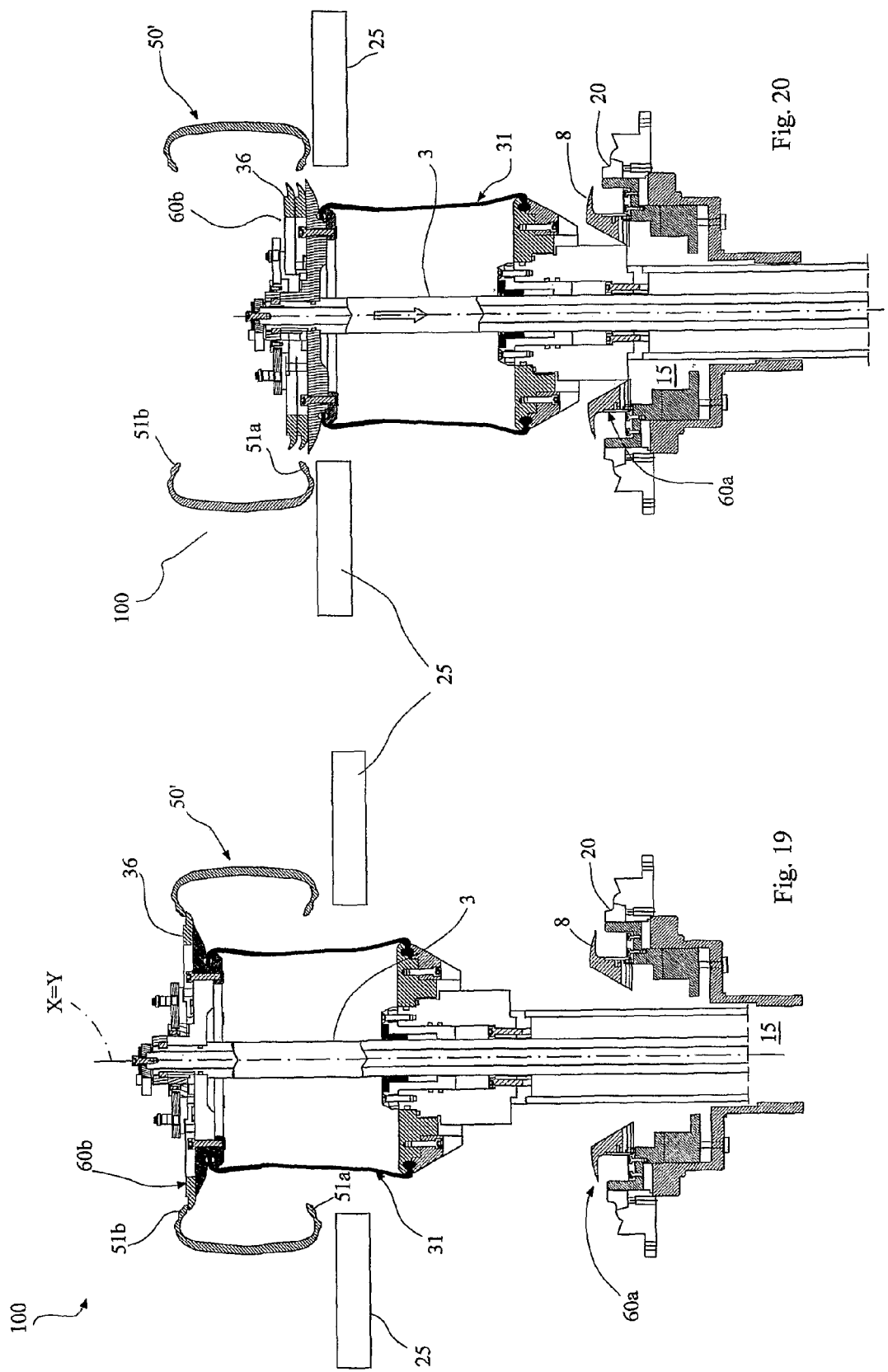

METHOD OF CONTROLLING A PHASE OF MOULDING AN ANNULAR FIXING STRUCTURE AND A TYRE INCLUDING AN ANNULAR FIXING STRUCTURE

CROSS REFERENCE TO RELATED APPLICATION

This application is a national phase application based on PCT/IB2009/006434, filed Aug. 4, 2009, the content of which is incorporated herein by reference, and claims the priority of International Application No. PCT/IT2008/000535, filed Aug. 4, 2008.

BACKGROUND OF THE INVENTION

1. Field of the Invention

The present invention relates to a method for controlling a phase of moulding an annular fixing structure and to a tyre for vehicle wheels including an annular fixing structure. The invention also relates to equipment for moulding and curing green tyres.

2. Description of the Related Art

In the production cycle of a tyre, following a tyre building process in which the various components of the tyre are made and/or assembled, a moulding and curing process is carried out for the purpose of defining the structure of the tyre according to a desired geometry, normally including a specific tread pattern.

For this purpose, the green tyre (in the present text, this term denotes a tyre which has not yet been moulded and cured) is enclosed in a mould cavity which is formed inside a curing mould and which is shaped according to the geometric configuration of the outer surfaces of the tyre to be produced.

When the curing is complete, the mould is opened for the removal of the tyre.

A tyre generally comprises a carcass structure, in the shape of a toroidal ring, including one or more carcass plies, reinforced with reinforcing cords lying in radial planes (in the case of what are known as radial tyres), in other words in planes containing the axis of rotation of the tyre. The ends of each carcass ply are fixed to at least one metal annular structure, usually known as the bead core, which reinforces the beads, in other words the radially inner extremities of said tyre, which serve to fit the tyre on a corresponding mounting rim. A band of elastomeric material, called the tread band, is placed on the crown of said carcass structure, and a relief pattern for ground contact is formed in this tread band at the end of the curing and moulding stages. A reinforcing structure, usually known as the belt structure, is placed between the carcass structure and the tread band. In the case of tyres for a car, this belt structure usually comprises at least two radially superimposed strips of rubberized fabric provided with reinforcing cords, usually metallic, positioned parallel to each other in each strip and crossing the cords of the adjacent strip, the cords being preferably positioned symmetrically about the equatorial plane of the tyre. Preferably, said belt structure also comprises a third layer of fabric or metal cords placed circumferentially (at 0 degrees), in a radially outer position, at least on the ends of the underlying strips.

Sidewalls of elastomeric material are also applied to the corresponding lateral surfaces of the carcass structure, each extending from one of the lateral edges of the tread band to the position of the corresponding fixing annular structure to the beads.

In the present description and in the following claims, the term "circumferential plane" denotes any plane passing through a radial axis of the tyre and perpendicular to the axis of rotation of the tyre.

The term "bead force" denotes a measurement of the resistance of the bead when inflated, in other words a measurement of the resistance offered by the bead to this type of deformation. A high bead force is desirable to prevent the tyre from rotating on the rim in vehicles with high torque in acceleration and/or braking, which would lead to a loss of performance.

US patent application no. US 2003/0141627, published in the name of the Goodyear Tire & Rubber Company, describes a method and equipment for moulding tyres with a radially extendable moulding ring for the beads. When extended, the bead moulding ring has a radial circumferential surface facing outwards for moulding the beads. The bead moulding rings each comprise a plurality of segments, half of which are first segments which are complementary to second segments and alternate circumferentially with the latter.

European patent application EP 0368546 relates to a method and equipment for bladderless tyre moulding. A bladderless tyre moulding press comprises two plates, namely an upper and a lower plate, and means for moving the plates relative to each other from an open position to a closed moulding position, plate mounting means for moulding the sidewalls of the tyre, and means for moulding the tread. Each of the plate mounting means serves to mould a corresponding bead of the tyre, and the bead moulding means include central means which are movable with respect to the corresponding plates for insertion into the tyre. Each plate includes bead moulding means which, when extended, form a surface for moulding an inner surface of the beads. The plates retain the beads and seal them against the sidewall plates of the mould, thus enabling a pressurized fluid to be introduced into the tyre.

US patent application no. 2008/0128947 in the name of Sumitomo Rubber Industries, Ltd relates to a method of making tyres in which a green tyre is inserted into a mould in which an inner plate and an inflatable bladder are present. During insertion, the diameter of the inner plate is reduced and the inflatable bladder is contracted. Following insertion, the diameter of the inner plate is increased in such a way that the surface of a bead of the green tyre bears on the plate. When the gas is introduced, the inflatable bladder is gradually expanded. The mould is locked in such a way that the pressure inside the bladder increases further. A portion of the peripheral inner surface of the green tyre which is not in contact with the plate is in contact with the inflatable bladder. The green tyre is heated by thermal conduction from the mould and from the inflatable bladder.

SUMMARY OF THE INVENTION

The applicant has observed that deformations of the green tyre, such as its ovalization, may occur during the moulding and curing process, leading to the presence of defects in the finished (cured) tyre, such as the disengagement of one or more carcass plies, or the presence of undesired excess and/or insufficient volumes of material. In particular, the design requirements for the production of high-performance tyres for top-range cars are such that these deformations may entail the rejection of the tyre.

The applicant has also verified that these geometrical deformations, and consequently the development of imperfections in the finished tyre, occur predominantly at the positions of the beads, each of the beads also being denoted below by the more general term "annular fixing structure".

As shown in the documents cited above, the applicant has verified that the green tyre is placed in the curing machine where it is inserted into a curing mould comprising a rigid support, an upper sidewall plate and a lower sidewall plate which are movable with respect to each other and which, when in the closed position, enclose the green tyre in a mould cavity. Each sidewall plate comprises a bearing surface for a corresponding axially outer surface of the annular fixing structure of the green tyre. In moulding and curing equipment that contains a bladder, the latter is expanded and pressed against the inner surface of the tyre while heat is supplied.

However, the applicant has observed that sufficiently accurate shaping cannot be achieved in annular fixing structures produced by moulding with the aforementioned inflatable bladder delimited by a membrane which compresses an axially inner surface portion of the annular fixing structures against a corresponding surface of the sidewall plates during the moulding and curing stage.

Insufficient circumferential uniformity at the level of the beads gives rise, in the finished product, to insufficient uniformity in the rolling of the wheel comprising the tyre, and consequently a high degree of vibration of the vehicle.

The applicant has verified that the tolerances required for top-range tyres cannot be achieved by adding extendable moulding rings for the area of the annular fixing structures to a curing mould, as described in the cited application US 2003/0141627, in such a way that these rings also come into contact with a surface portion of the annular fixing structure during the moulding and curing stage with the bladder expanded.

The applicant has also verified that processes such as those described in EP 0368546 do not yield satisfactory results when applied to tyres built from elementary intermediate products, particularly when the latter are moulded and cured while not associated with their forming supports. In this case, these tyres require the presence of a bladder inside a curing mould to achieve correct moulding and curing, since the bladder permits the substantially uniform transmission of the pressure and heat required for the tyre. The absence of a bladder, leading to direct contact between the pressurized fluid and the radially inner surface of the green tyre, can give rise to a number of problems, such as the permeation of the fluid into the tyre structure or deviations from the desired configurations of the various elementary components from which the tyre is formed. Because of the expansion which the pressurized fluid causes in the tyre, these deviations of the elementary components are particularly common at the positions of the annular fixing structures. These problems can then give rise to defects in the finished tyre and lead to the rejection of the tyre.

The applicant has also verified that the compression of the annular fixing structures which takes place between the plate included in the moulding means and the sidewall plate of the mould in the equipment described in EP 0368546 causes a swelling in the area of the annular fixing structures lying axially inside the tyre and radially outside the circumferential edge of the compression plate, since the deformation caused by the compression by the pressurized fluid causes a displacement of material immediately outside the area delimited by the surfaces in contact with the annular fixing structures, thus creating geometrical irregularities and excess volumes of material which should be avoided or at least minimized.

Moreover, the applicant has verified that the process described in US 2008/0128947 does not permit sufficiently accurate bead moulding for top-range tyres, since, although the bead area is delimited between the sidewall plate of the mould and the bead moulding plate, a correct positioning of the bead between the opposing sidewall plate and plate surfaces defined in this way is not guaranteed, because the green tyre can bear on the sidewall plate in an irregular way and the pressure exerted on the bead by the plate may therefore be non-uniform, depending on the point(s) at which the bead bears on the sidewall plate when the green tyre is inserted into the mould.

The applicant has therefore realized that it is necessary to devise a method for controlling the moulding of an annular fixing structure of a green tyre in which the bead area is suitably positioned on the sidewall plate of the mould by a suitable movement of surfaces opposed to each other, and is pressed in two successive steps, thus ensuring the uniformity of the bead along its extension and a high "bead force" for any given structure.

Finally, the applicant has found that, by confining the volume within the curing mould for the area relating to the annular fixing structure of the tyre by using two surfaces opposed to each other, that is to say between an axially inner surface and a substantially opposing axially outer surface of the bead, it is possible to obtain a precise and uniform geometry of the bead by an initial compression of the bead to fit it correctly into the mould, followed by a second compression at higher pressure for moulding the bead.

More precisely, according to a first aspect, the invention relates to a method for controlling a phase of moulding an annular fixing structure of a green tyre, said method comprising the steps of:
  introducing said green tyre into a curing mould including an inflatable bladder;
  delimiting at least one portion of said annular fixing structure by using a first and a second surface opposed to each other;
  bringing said first and second surface towards each other so as to bring a portion of said first surface and a portion of said second surface into contact with a corresponding radially inner and axially inner surface portion and a corresponding radially inner and axially outer surface portion, respectively, of said annular fixing structure, thus generating a first squeezing pressure;
  inflating said inflatable bladder of said curing mould so as to bring said first surface and said second surface closer together, thus generating a second squeezing pressure so as to shape said radially inner and axially inner and radially inner and axially outer surface portions of said annular fixing structure.

The applicant has verified that, when this system is used, the annular fixing structure is particularly uniform along its extension, thus ensuring regularity in rolling and therefore minimizing vibrations in the vehicle on which the wheel including the tyre is fitted.

Moreover, the correct configuration of the annular fixing structure in the mould, due to the first movement of the two surfaces towards each other, preferably by translation, which positions the bead in a substantially uniform way against the sidewall plate of the mould even before the bladder is inflated, enables the rim to be positioned in an optimal way with respect to the seat of the mould, thus preventing uncontrolled movements of the green tyre during insertion. A compression of the bead area produced solely by the inflation of the bladder would not be uniform, since the force of the bladder can vary according to the area of compression, thus resulting in non-uniformity of the bead area.

Furthermore, the delimitation of the bead area facilitates the calculation of the quantity of mixture—that is to say the material forming the tyre—required to produce a high degree of compression: by making the bead of the green tyre from a quantity of material slightly greater than the necessary amount, in other words greater than the volume contained between the two opposing surfaces when the volume of the bead is confined, it is possible to achieve optimal moulding quality, owing to the viscosity of the green mixture.

Additionally, the risks of disengagement of plies are minimized by keeping the bead area confined while the pressure is exerted by the bladder. In the initial moulding steps in which the pressure is gradually increased by squeezing the two surfaces, the carcass becomes elastically loaded and the resistance to the disengagement of the plies from the rim is provided virtually exclusively by the high viscosity of the elastomeric materials forming the mixture. However, this is insufficient to ensure that disengagement does not occur. The confinement of the bead area between the two opposing surfaces significantly increases the resistance by means of the "clamping" effect created by the two surfaces. The finished tyre can therefore be produced with over-standard carcass stretches, with consequent advantages in respect of handling performance, which have been verified experimentally by the applicant.

According to a second aspect, the invention relates to a tyre comprising:
  a toroidal ring-shaped carcass structure, including at least one carcass ply associated with at least one annular fixing structure;
  a tread band positioned radially externally with respect to said carcass structure;
in which said annular fixing structure includes a radially inner and axially inner surface and a radially inner and axially outer surface, these surfaces being substantially opposed to each other, said radially inner and axially inner surface and said radially inner and axially outer surface having been shaped by the successive application to them of:
  a first squeezing pressure produced by using a first and a second surface of a curing mould which are brought towards each other;
  a second squeezing pressure produced by using said first and said second surfaces which are brought closer together.

According to a third aspect, the invention relates to equipment for moulding and curing green tyres, said equipment comprising:
  a curing mould comprising a first and a second surface which are substantially opposed to each other;
  said first and said second surface being movable with respect to each other so as to bring a portion of said first surface and a portion of said second surface into contact with a corresponding radially inner and axially inner surface portion and a corresponding radially inner and axially outer surface portion, respectively, of an annular fixing structure of said green tyre, by using a first squeezing pressure;
  an inflatable bladder associated for operation with said curing mould and capable of exerting a pressure against at least one of said first and said second surface, so as to bring said first surface and said second surface closer together in such a way that said radially inner and axially inner surface portion and said radially inner and axially outer surface portion of said annular fixing structure are shaped by using a second squeezing pressure.

Advantageously, the equipment according to the invention is similar to conventional equipment used for moulding and curing tyres, with relatively few modifications. More specifically, what is modified is the locking of at least one of the annular fixing structures by its confinement by using two surfaces which are movable, preferably by translation, with respect to each other, and which can generate, in combination or without the inflatable bladder, a pressure on the bead.

In at least one of the aforesaid aspects, the present invention can have at least one of the following preferred characteristics.

Preferably, the step of delimiting at least one portion of the annular fixing structure comprises the step of radially extending said first surface from a first contracted position, in which it has a maximum diameter in a circumferential plane of said green tyre which is less than the diameter of the green tyre at the location of said annular fixing structure, to a second, expanded position, in which it has a maximum diameter in a circumferential plane of said green tyre which is greater than the diameter of the green tyre at the location of said annular fixing structure.

Substantially, the bead is delimited by the bearing of the tyre on the second surface and by the radial extension of the first surface in such a way as to form a "clamp" to lock it.

Even more preferably, the step of extending said first surface comprises the step of radially extending at least two sub-surfaces, separate from each other, which extend angularly in said circumferential plane over a total angle of more than 18°.

According to a further characteristic of the invention, said step of extending said first surface comprises the step of radially extending a plurality of sub-surfaces which, in the expanded operating position, generate a single continuous surface in the form of a circumferential ring.

The first surface is formed by at least two sub-surfaces, separate from each other, which act as a plane and are brought into contact with the radially inner and axially inner surface portion of the bead at not less than two points, and which have a sufficient angular extension to provide the correct locking and subsequent compression of this portion.

The sub-surfaces may be such that they mate with each other, in the extended operating position, to form a continuous surface in the shape of a circumferential ring.

In a preferred embodiment, the distance between the radially outermost point of said first surface and the radially innermost point of said corresponding radially inner and axially inner surface of said annular fixing structure projected on a circumferential plane is in the range from approximately 5 mm to approximately 40 mm.

More preferably, said distance is in the range from approximately 7 mm to approximately 20 mm.

Preferably, said first squeezing pressure is less than said second squeezing pressure.

Preferably, said first squeezing pressure is in the range from approximately 0.1 bar to approximately 5 bars.

Preferably, said second squeezing pressure is greater than 0.2 bar and equal to or less than approximately 8 bars.

Preferably, said mould includes a first sidewall plate including said second surface for contacting said radially inner and axially outer surface portion of said annular fixing structure, and a first bead moulding ring including said first surface for contacting said radially inner and axially inner surface portion of said annular fixing structure.

More preferably, the step of delimiting at least one portion of said annular fixing structure comprises the step of radially extending said bead moulding ring from a contracted operating position to an expanded operating position, thus delimiting said portion of said annular fixing structure between said sidewall plate and said bead moulding ring.

The "clamping" of the bead takes place substantially between one of the sidewall plates of the mould and a bead moulding ring having a variable diameter.

Even more preferably, the step of bringing said first and said second surface towards each other comprises the step of translating said first bead moulding ring towards said first sidewall plate.

Additionally, the step of inflating said inflatable bladder of said curing mould so as to bring said first surface and said second surface closer together comprises the step of translating said first bead moulding ring further towards said first sidewall plate by compressing said first bead moulding ring by using said inflatable bladder.

The resulting shape of the radially inner and axially outer and/or axially inner surface portion is variable and depends on the surfaces with which it comes into contact.

In a preferred embodiment, the shaping of said radially inner and axially inner surface and of said radially inner and axially outer surface is carried out by squeezing a portion of said radially inner and axially inner surface against said first surface of the curing mould at said first squeezing pressure, and by squeezing a portion of said radially inner and axially outer surface against said second surface of the curing mould.

Advantageously, the shaping of said radially inner and axially inner surface and of said radially inner and axially outer surface is carried out by squeezing said portion of said radially inner and axially inner surface against said first surface of the curing mould at said second squeezing pressure, and by squeezing said portion of said radially inner and axially outer surface against said second surface of the curing mould.

Preferably, the distance between the radially outermost point and the radially innermost point of said radially inner and axially inner surface portion projected in a circumferential plane is in the range from approximately 5 mm to approximately 40 mm.

More preferably, said distance is in the range from approximately 7 mm to approximately 20 mm.

Preferably, said radially inner and axially outer and/or axially inner surface portion has a shape including air evacuation channels.

Alternatively or additionally, said radially inner and axially outer and/or axially inner surface portion has a substantially flat shape.

Alternatively, said radially inner and axially outer and/or axially inner surface has an undulating shape.

Alternatively, said radially inner and axially outer and/or axially inner surface has a shape including a plurality of lobes.

In a preferred embodiment, the equipment includes a first sidewall plate comprising said second surface for contacting said radially inner and axially outer surface portion of said annular fixing structure.

Advantageously, the equipment includes a first bead moulding ring comprising said first surface for contacting said radially inner and axially inner surface portion of said annular fixing structure.

In a preferred embodiment, in the equipment according to the invention, the first bead moulding ring includes at least two circumferentially alternating elements which are movable from a first contracted operating position, which forms a maximum diameter smaller than the diameter of said annular fixing structure, to a second, expanded operating position, having a maximum diameter.

Alternatively, the first bead moulding ring includes at least one plurality of circumferentially alternating elements which are movable from a first, contracted, operating position, which forms a maximum diameter smaller than the diameter of the annular fixing structure, to a second, expanded operating position having a maximum diameter, in which they form a continuous surface in the form of a circumferential ring in the expanded operating position.

Additionally, the aforesaid first and second operating positions preferably lie in a circumferential plane of said green tyre and said maximum diameter is greater than the diameter of said annular fixing structure of said green tyre.

Other features and advantages of the invention will be made clear by the detailed description of a preferred, but not exclusive, embodiment of a method controlling a phase of moulding of an annular fixing structure of a tyre for vehicle wheels including an annular fixing structure, and of equipment for the execution of the aforesaid method according to the present invention.

BRIEF DESCRIPTION OF THE DRAWINGS

This description is given below with reference to the appended drawings, which are provided for guidance only and which are therefore non-limiting, in which:

FIGS. 14 to 20 show a plurality of steps of the method of controlling a phase of moulding an annular fixing structure of a green tyre, in which the moulding and curing equipment is depicted schematically, in lateral section, and only partially.

DETAILED DESCRIPTION OF THE INVENTION

Figure 1:
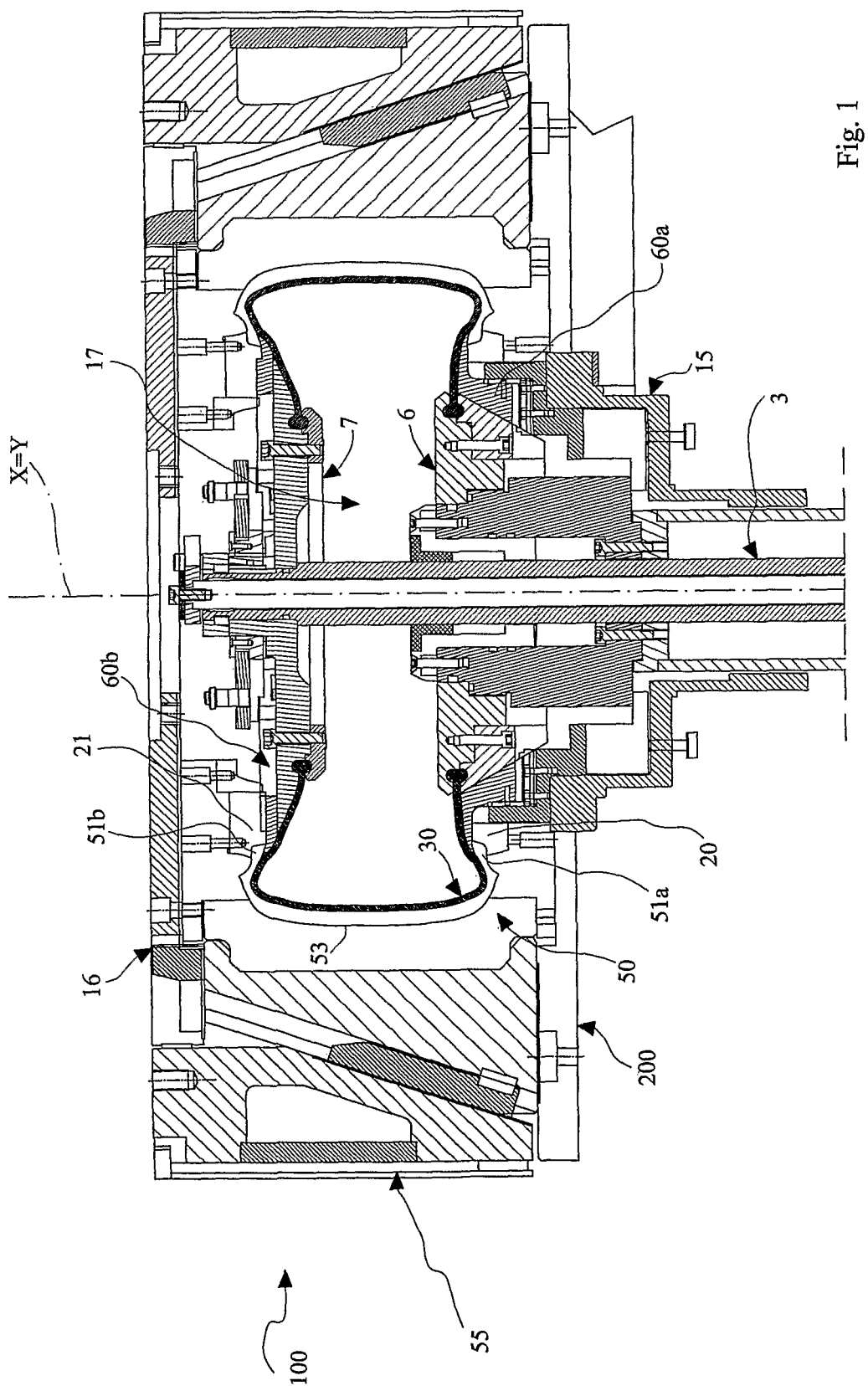
FIG. 1 is a sectional schematic side view of equipment for moulding and curing tyres according to the present invention in a first operating position.

With reference to FIG. 1 initially, the number 100 indicates equipment for moulding and curing tyres for vehicle wheels according to the present invention.

The equipment 100 is capable of accommodating green tyres 50 assembled in a preceding manufacturing phase, or in a suitable building phase; for example, the green tyres 50 can be built from elementary components such as continuous elongate elements of elastomeric material, strip elements cut to size and containing at least two fabric or metal cords running parallel to each other, or rubberized fabric or metal cords deposited on a suitable forming support.

In detail, the green tyre 50, shown only in section and schematically in the appended FIG. 1, defines an axis X substantially coinciding with its own axis of rotation and comprises a carcass structure 52 including at least one carcass ply (not numbered in the drawings) which is associated for operation with a pair of annular fixing structures 51a and 51b, a tread band 53 in a position radially external to said carcass structure, and a belt structure (not shown) interposed between the carcass structure and the tread band 53.

As shown schematically in FIG. 1, the annular fixing structures 51a and 51b represent the two opposing ends of the green tyre 50.

The equipment 100 comprises a curing mould 200 which has a lower sidewall plate 20 and an upper sidewall plate 21 which are, respectively, engaged with a base 15 and with a closing portion 16 of a container 17, and a substantially cylindrical telescopic central body 3, with an axis Y, into which the green tyre 50 is inserted. The central body 3 is moved in its axial telescopic elongations and contractions by using hydraulic cylinders (not shown), for example.

The mould 200 also includes a ring of circumferential sectors 55 which define a mould cavity in which is defined a geometric axis which coincides with the axis Y of the central body 3 and which preferably also coincides, as shown in FIG. 1, with the axis of rotation X of the green tyre 50 when the latter is inserted into the equipment 100.

The circumferential sectors 55 generally carry forming projections (not shown in FIG. 1) and are designed to act on a radially outer surface of the tread band 53 of the green tyre 50, to create in this tread band a series of indentations and channels positioned suitably in a desired "tread pattern".

To enable a single reference system to be used, the "axial" directions in the following text are directions parallel to the central body 3 and parallel to the axis of rotation X of the tyre inserted into the equipment 100. Similarly, a radial direction is the direction of a radius originating on the axis of rotation (perpendicular to it) of the tyre. In a similar way, "internal" and "external", and terms related thereto, refer to the inner cavity of the equipment (described more fully below) and/or of the tyre.

The base 15 and the closing portion 16, together with the corresponding lower sidewall plate 20 and upper sidewall plate 21, are movable with respect to each other between an open condition in which they are remote from each other to permit the introduction of the green tyre 20 to be cured into the mould 200, and a closed position in which they are placed next to each other to enclose the green tyre 50 in the mould cavity (in other words, the container 17).

In detail, the sidewall plates 20 and 21 face each other and are designed to act, respectively, on the opposing annular fixing structures 51a and 51b of the green tyre 50, in order to shape its axially inner and outer surfaces, as described more fully below.

Figure 2:
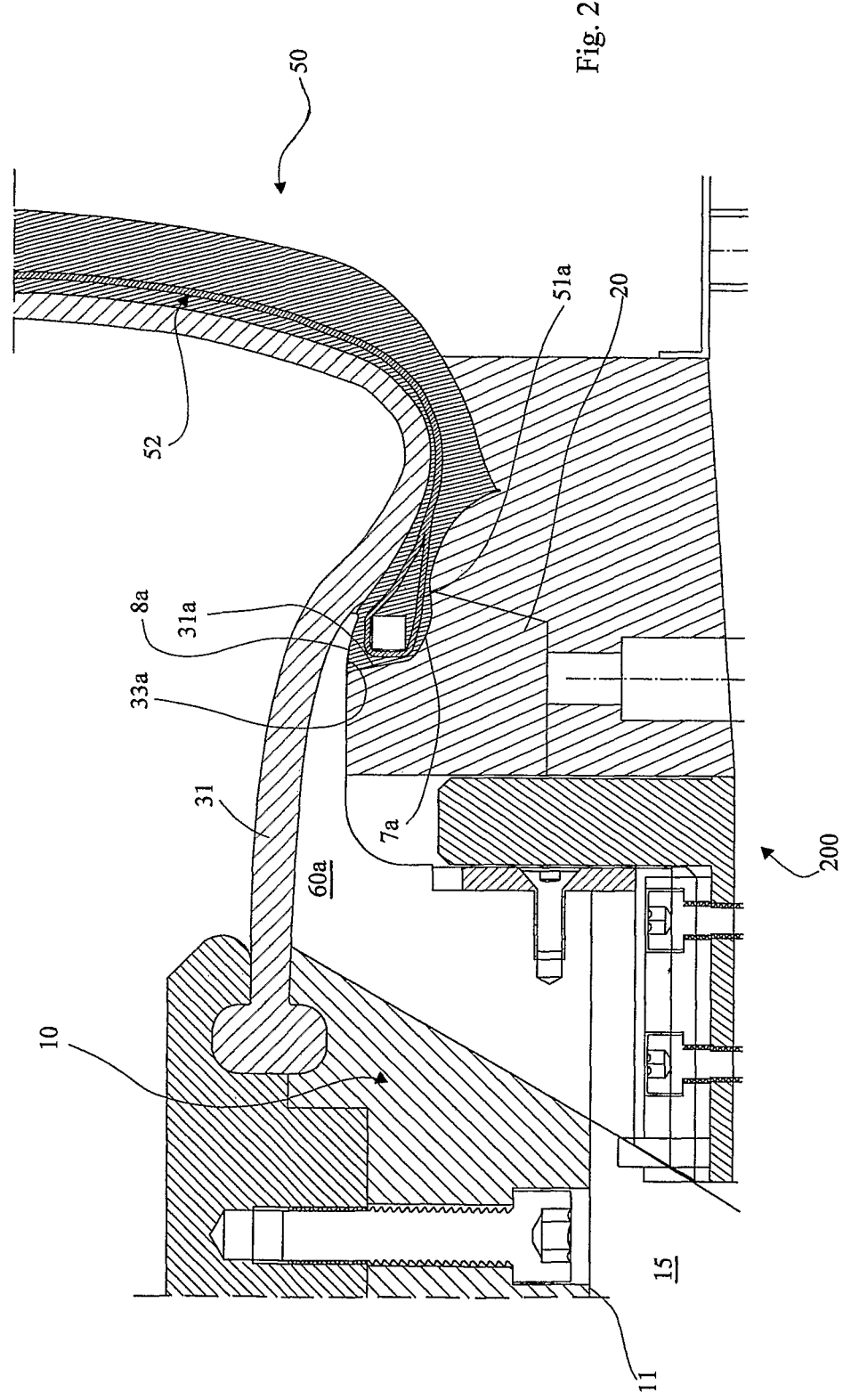
FIGS. 2 and 3 show enlargements of two details of the equipment of FIG. 1.
Figure 2A:
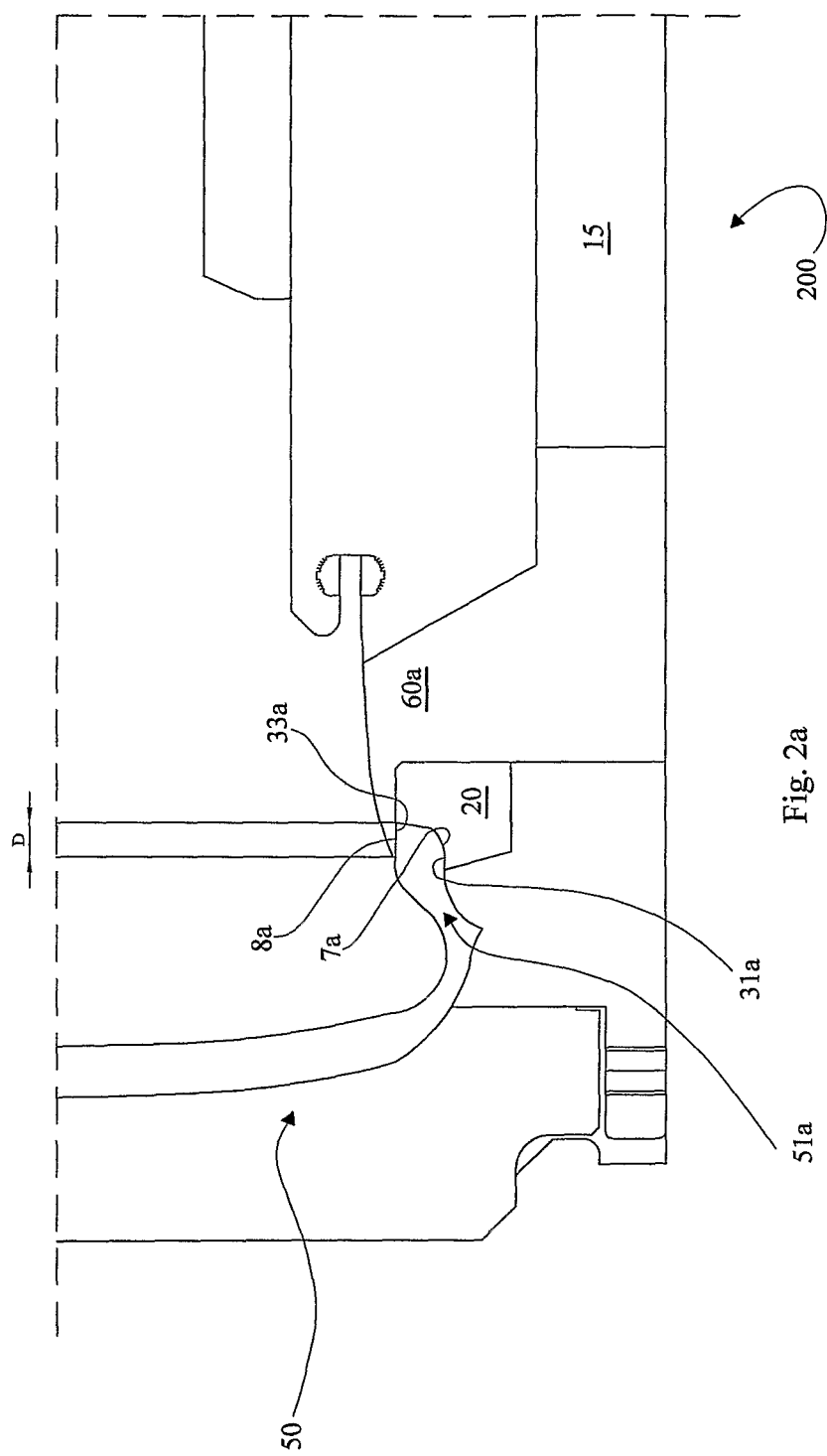
FIG. 2a shows the detail of FIG. 2 further simplified.
Figure 3:
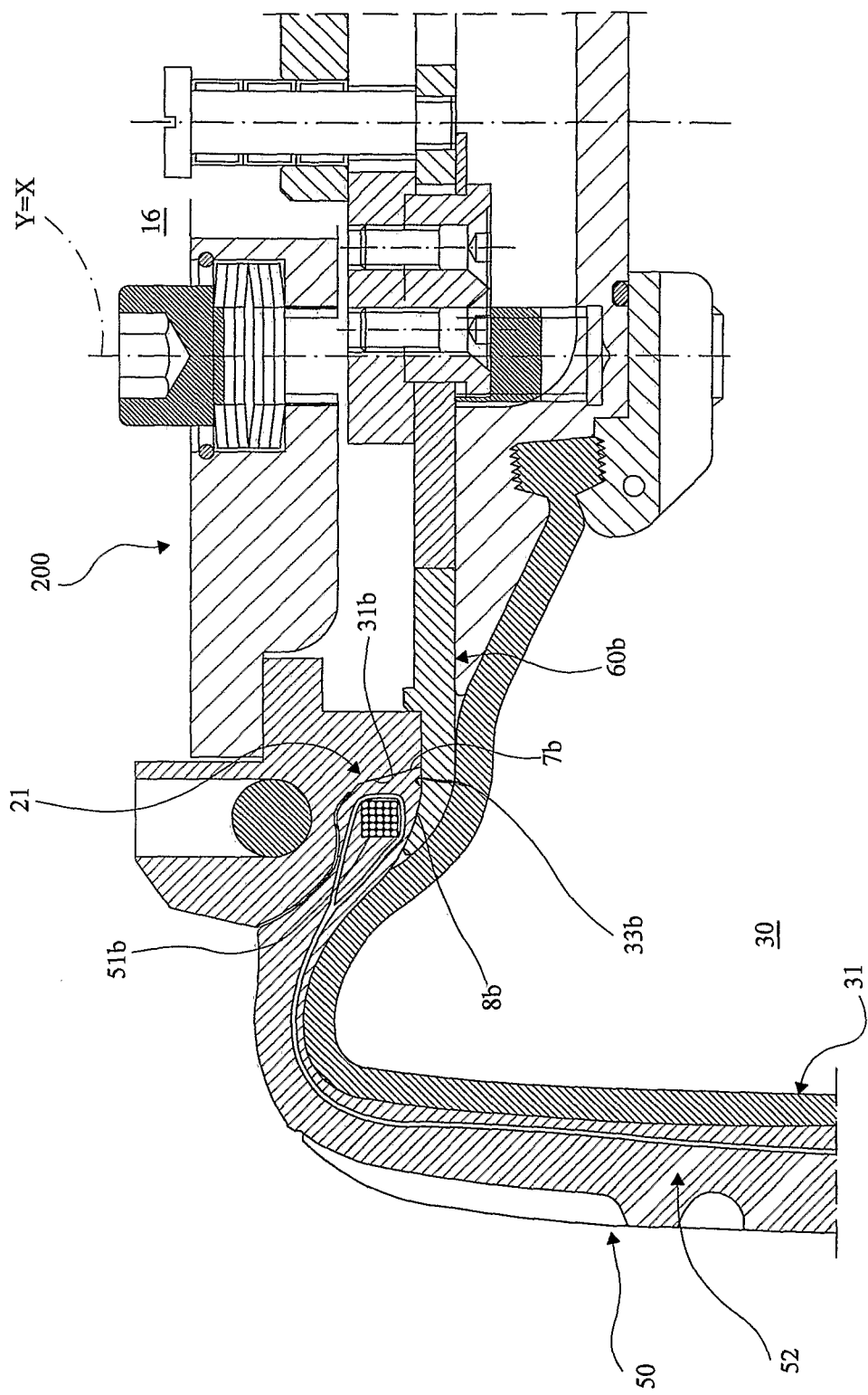

Preferably, with reference to the details shown in FIGS. 2, 3 and 2a, each of the sidewall plates 20, 21 has a perimetric supporting surface 31a, 31b, on a portion of which a respective portion of a radially inner and axially outer surface 7a, 7b of the annular fixing structures 51a, 51b bears.

Additionally, an expandable bladder 30 of toroidal shape, delimited by a membrane 31, is fixed to the telescopic central body 3, preferably at its two opposing ends. The bladder 30 can expanded during the moulding and curing process, so as to bring the membrane 31 into contact with the radially inner surface of the green tyre 50, thus pressing this surface outwards and supplying heat to it, and in this way exerting a moulding pressure and transmitting at least some of the heat required for curing.

The bladder 30 is inflated by using a feed device which introduces a fluid, such as steam, air or inert gases, through a suitable passage which is not shown in the drawings, until the desired moulding pressure is reached.

As shown more fully below, the expandable bladder 30 is also capable of exerting a pre-moulding pressure referred to hereafter as the "second squeezing pressure", in order to bring the first and second annular fixing structures into contact with the upper and lower sidewall plates, so as to shape the radially inner and axially outer surface portion 7a, 7b of each annular fixing structure 51a, 51b by using the respective sidewall plate 20, 21, together with a radially inner and axially inner surface portion 8a, 8b of each annular fixing structure, as detailed below.

The reference numerals in FIG. 2a indicate the various surfaces to provide a clear identification of these with reference to the lower annular fixing structure 51a.

The equipment 100 also comprises a first plate 6 and a second plate 7 fixed to the two opposite ends of the central telescopic element 3. The equipment 100 also includes at least a first bead moulding ring 60a, and more preferably two bead moulding rings, namely an upper and a lower ring 60a, 60b, which are movable from a first contracted operating position to a second expanded operating position in which they form a contact surface 33a, 33b. In this second expanded operating position, with the green tyre 50 inserted in the mould 200, each ring 60a, 60b can come into contact with the first radially inner and axially inner surface portion 8a, 8b respectively of the first and the second annular fixing structures 51a, 51b of the green tyre 50. In the contracted position, the bead moulding rings 60a, 60b have a diameter smaller than the diameter of the green tyre 50 at the locations of the annular fixing structures 51a, 51b, thus enabling the tyre to be inserted into or removed from the central body 3.

Preferably, the lower and upper bead moulding rings 60a, 60b are fixed at the locations of the plates of the central body 3, and are concentric with this body (in other words, the axis Y passes through the centre of each ring).

The configuration of the equipment 100 at the location of the lower sidewall plate 20 is described more fully below, and this description, where no express indication to the contrary is given in the text, is preferably also to be interpreted as referring to the configuration of the equipment 100 at the location of the upper sidewall plate 21.

When the green tyre 50 is inserted into the mould 200 and the lower bead moulding ring 60a is in an expanded position, as stated above, the radially inner and axially outer surface portion 7a of the lower annular fixing structure 51a of the tyre bears against a portion of the supporting surface 31a belonging to the lower sidewall plate 20 of the mould, while the portion of the radially inner and axially inner surface 8a of the annular structure 51a bears against a surface portion 33a formed on the lower bead moulding ring 60a which also acts as a stop surface, the structure thus being "clamped" between the two opposing surfaces which exert a first squeezing pressure on the bead.

When the bladder 30 is expanded up to the second moulding pressure, the membrane 31 comes into contact with a second axially inner surface portion of the lower annular fixing structure 51a which is located in a radially outer position with respect to the area of contact between the annular fixing structure 51a and the lower bead moulding ring 60a (in other words, a radially outer position with respect to the first surface portion 8a), and which is contiguous to this area. The pressure exerted by the membrane 31 on the inner surface of the green tyre 50 as described more fully below enables the annular fixing structure 51a to be moulded accurately, since the membrane acts as a further stop surface for the annular structure, thus creating a specific shape of the radially inner and axially outer surface 7a and the radially inner and axially outer surface 8a of the annular structure 51a.

FIGS. 2 and 3 show two enlarged details with the tyre 50 inserted and the bladder 30 expanded, and with the bead moulding rings 60a, 60b both in the expanded operating position of the equipment 100 at the locations of the lower sidewall plate 20 and the upper sidewall plate 21 respectively. As shown in FIG. 2, the lower annular fixing structure 51a is locked and delimited by a plurality of surfaces, in portions of both its radially inner and axially inner surface 8a and its radially inner and axially outer surface 7a; in other words, its radially inner and axially inner surface portion 8a is delimited by a portion of the circumferential surface 33a of the lower bead moulding ring 60a and by a portion of the membrane 31, while its radially inner and axially outer surface portion 7a is delimited by the perimetric surface 31a of the lower sidewall plate 20. FIG. 3, in which the letter "a" is replaced with "b" in the reference numerals of the above description, shows how the upper annular fixing structure 51b is also locked between two surfaces.

The lower bead moulding ring 60a is shown schematically in detail in FIGS. 4a, 4b and 5a, 5b. The ring includes a series of sectors divided into a first and a second plurality 8, 9, each sector of the first plurality 8 alternating circumferentially with a sector of the second plurality 9. The sectors of the first plurality 8 are radially divergent; in other words, as they depart from the axis Y of the mould 200 they have the shape of a segment whose edge 34 defines a radially outer circular sector which has a greater extension than a radially inner edge opposite thereto. The sectors of the second plurality 9 are radially convergent; in other words each of them is also shaped in the form of a segment, but an edge 34' defines a radially inner sector of a circle which has the greater extension of each segment as compared with a radially outer edge opposite thereto.

The ring 60a also includes an element 10 in the shape of a cone or a truncated cone positioned parallel to the axis Y of the mould 200, and having its vertex 11 inserted into the centre of the bead moulding ring 60a.

Additionally, the sectors 8, 9 can slide from a contracted operating position to an extended operating position. In the first contracted operating position, the edge 34 defining the radially outer circular sector of said first plurality 8 and the edge 34' defining the radially inner circular sector of said second plurality 9 are offset in said first contracted operating position of said first bead moulding ring 60a; in other words, the second plurality of convergent sectors 9 is more re-entrant (having a smaller distance between the circular sector 34' and the axis Y) than the first plurality 8 of divergent sectors.

Figure 5B:
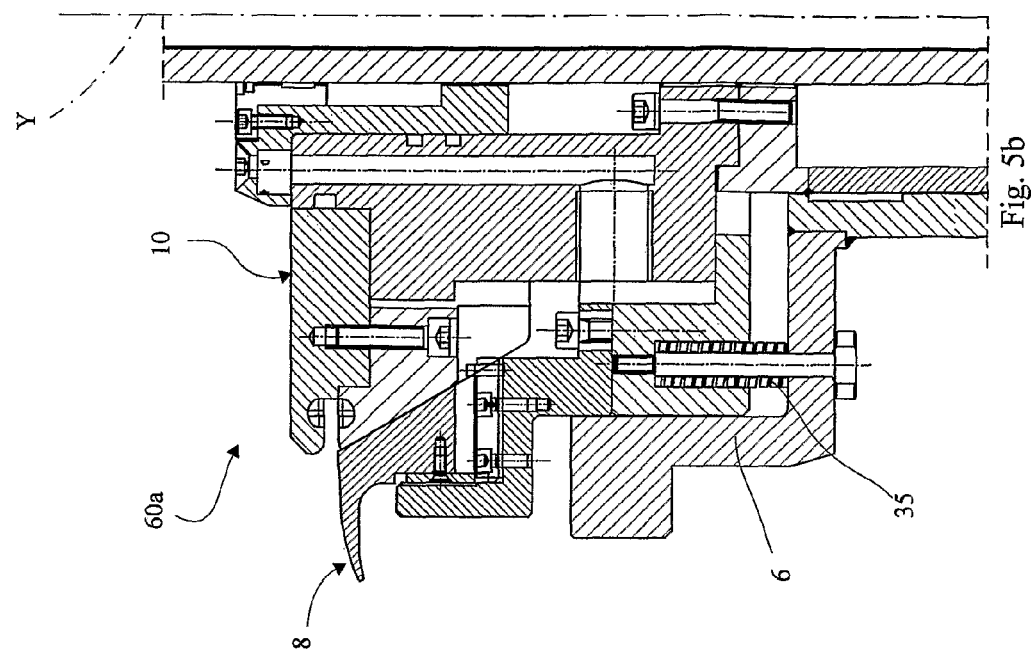
FIGS. 5a and 5b show, respectively, a perspective view and a partial view in lateral section of the lower bead moulding ring in a second operating position.
Figure 4B:
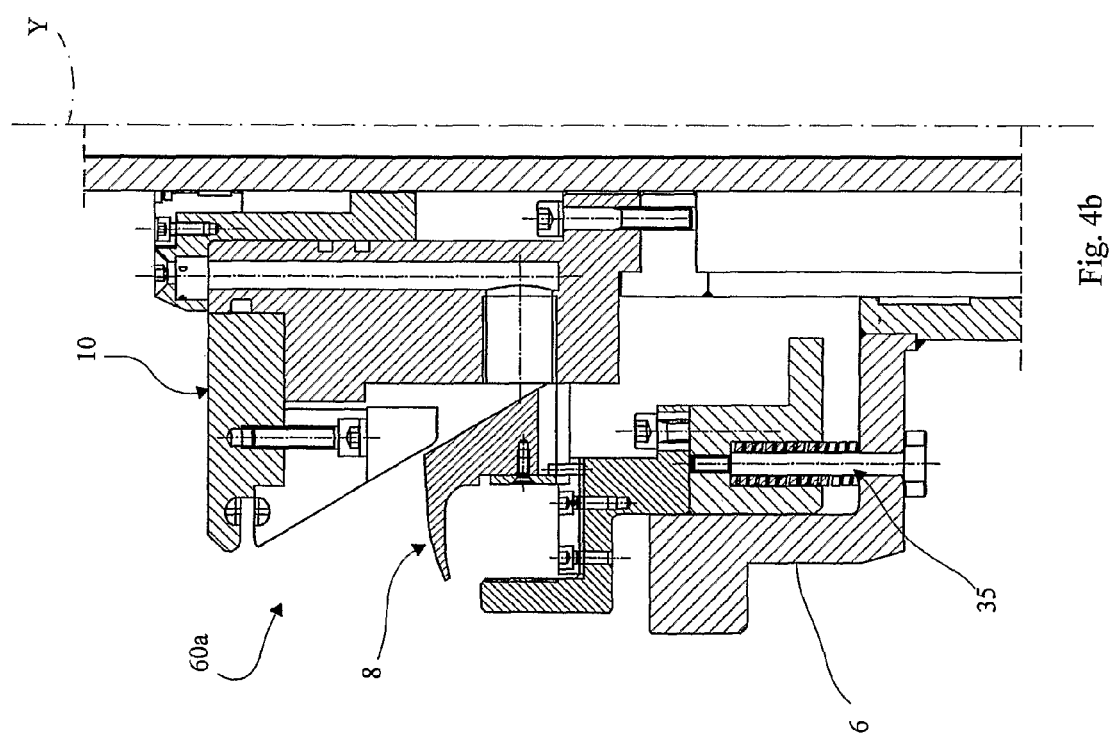
FIGS. 4a and 4b show, respectively, a perspective view and a partial view in lateral section of a lower bead moulding ring in a first operating position.
Figure 5A:
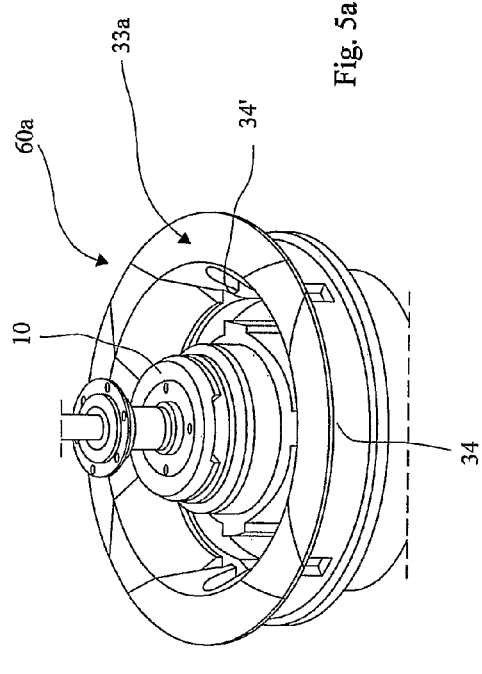
Figure 4A:
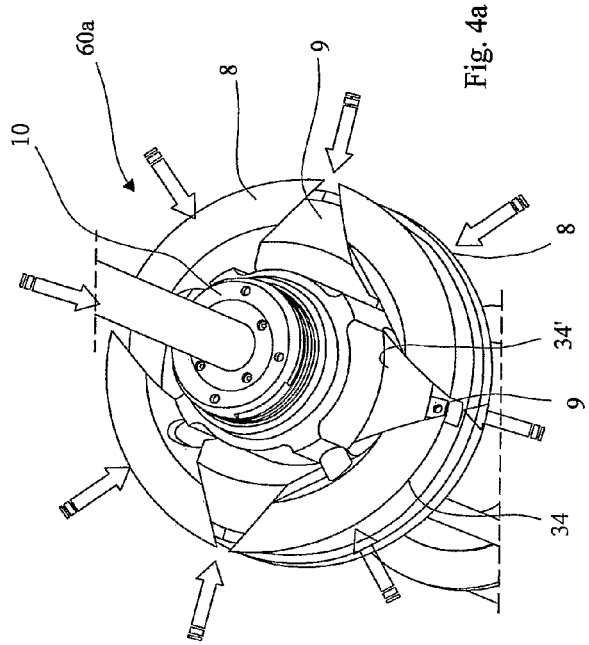

The contracted operating position is reached when the cone-shaped element 10 is only partially inserted into the centre of the ring 60a and does not create any compression towards the plate 6 (see FIGS. 4b and 5b). When the cone-shaped element 10 moves towards the plate 6, this movement being provided by hydraulic cylinders for example, the first and second plurality of sectors 8, 9 are extended, by their downward translation and simultaneous radial movement. The second plurality of convergent sectors 9 is aligned with the first plurality of divergent sectors 8; in other words, the edge 34 of said first plurality of divergent sectors 8 is circumferentially aligned with a radially outer edge of said second plurality of convergent sectors 9 in said second extended operating position of the ring, thus forming a continuous circumferential surface 33a (see FIG. 5a).

Opposing springs 35 (visible in FIGS. 4b and 5b) ensure that the sectors 8, 9 contract when the cone-shaped element 10 is translated away from the plate 6, and that the diameter of the ring 60a is reduced.

Figure 6:
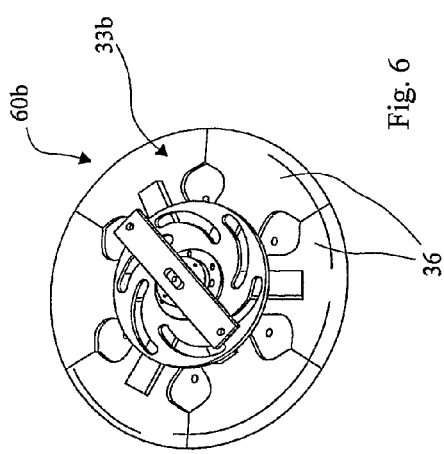
FIG. 6 shows a perspective view of an upper bead moulding ring in a first operating position.
Figure 7:
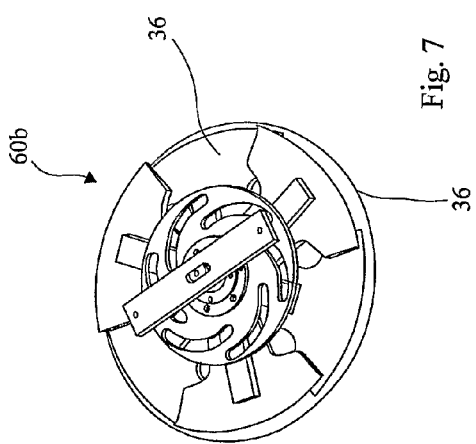
FIG. 7 shows a perspective view of the upper bead moulding ring in a second operating position.

With reference to FIGS. 6 and 7, the second bead moulding ring 60b comprises a plurality of petal-like elements 36 having substantially identical shapes to each other, said elements 36 being movable from a first contracted operating position in which they are partially superimposed to a second operating position in which they are contiguous. The movement from one operating position to the other takes place, for example, by a relative rotation of the elements 36 by using a driving cam on a splined shaft (not shown in the drawings).

Figure 8:
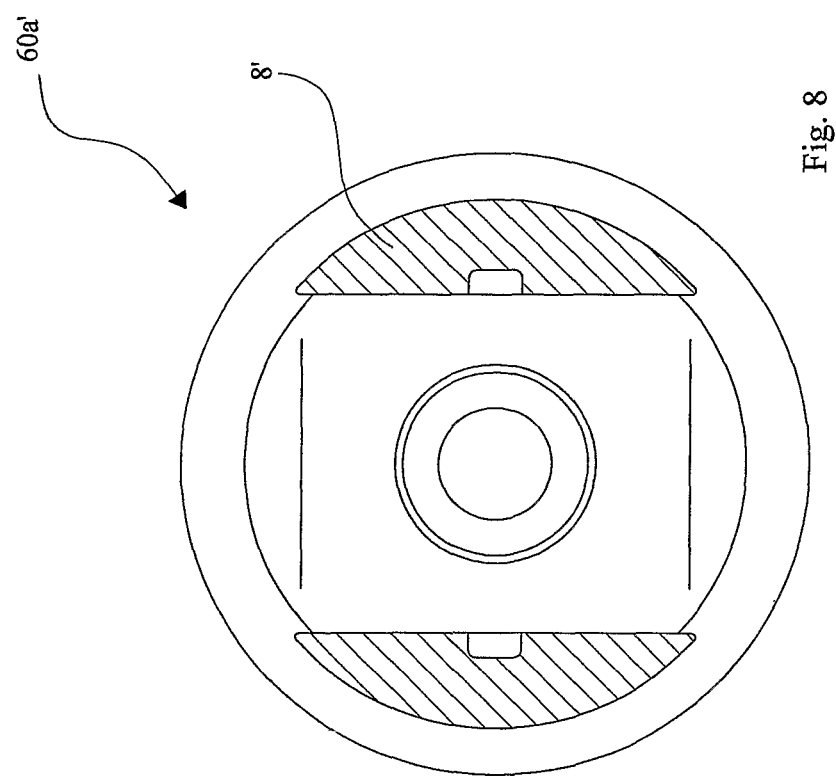
FIGS. 8 to 10 show views from above of further different preferred examples of embodiment of the lower and/or upper bead moulding ring in a first operating position.
Figure 9:
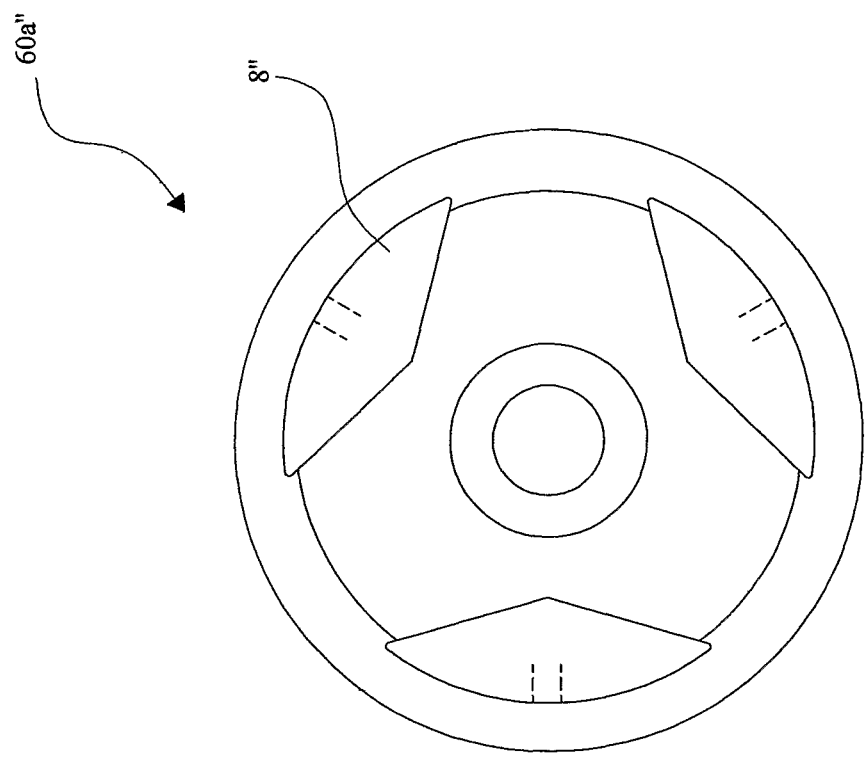
Figure 10:
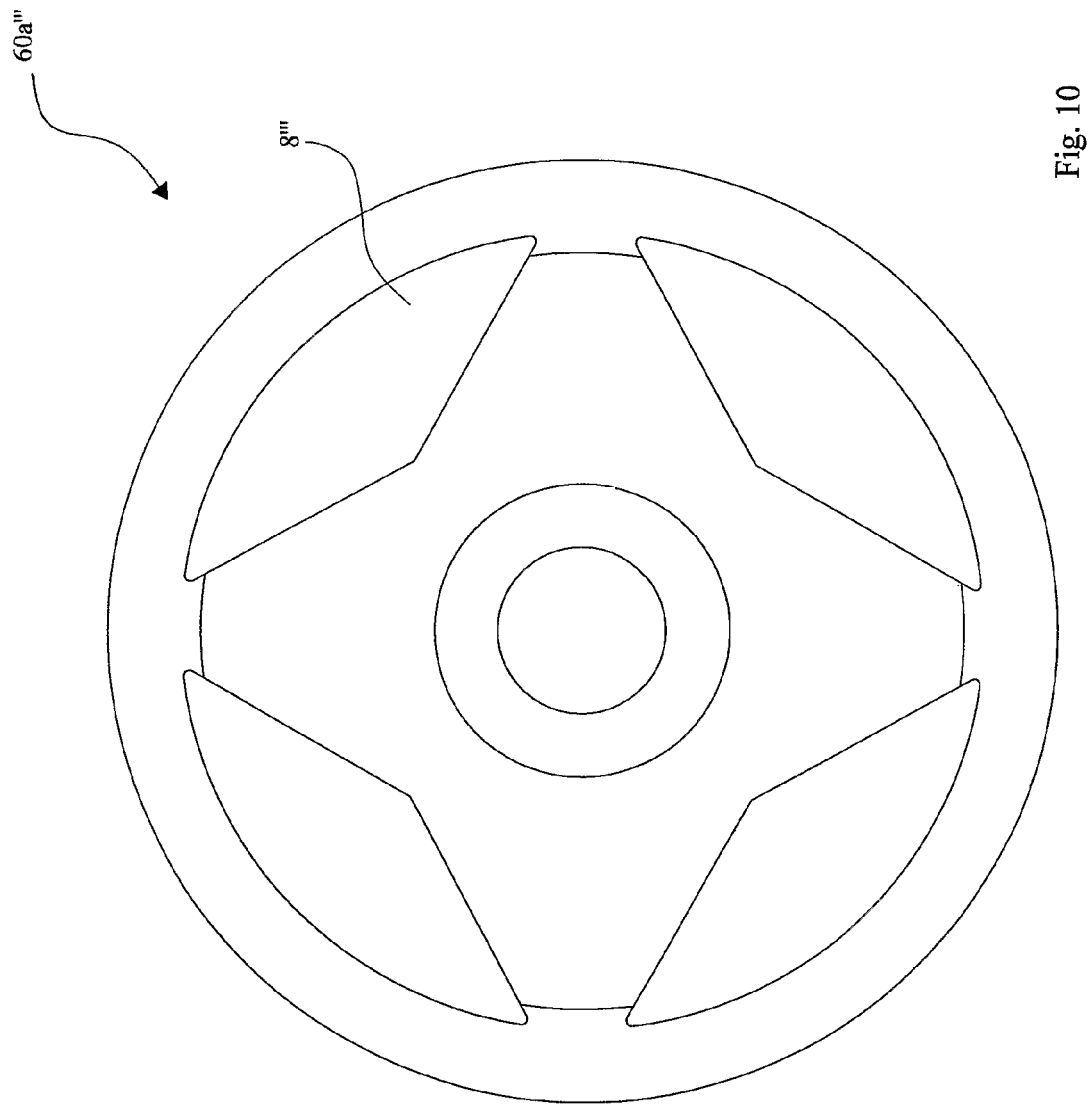

In a different embodiment, the bead moulding ring 60a, 60b does not include a continuous contact surface 33a, 33b in the form of a circular ring, as described above, but, when expanded, it also includes various separated and non-contiguous sub-surfaces in this operating position. As shown in FIGS. 8, 9 and 10, the moulding ring 60a', 60a" and 60a''' comprises 2, 3 or 4 sectors 8', 8", 8''' respectively, but the number of sectors 8 can be determined at will, these sectors being movable, as stated above, from a contracted operating position to an expanded operating position. However, it is preferable for the angular extension of the separate sub-surfaces in a circumferential plane to form an angle greater than 18°.

In order to move from one operating position to the other, it is possible, for example, to use the cone-shaped element 10 (not shown in FIGS. 8 to 10), which was described above with reference to FIGS. 6 and 7, in the bead moulding rings 60a', 60a", 60a''' of FIGS. 8-10.

Additionally, each surface or sub-surface of the bead moulding rings can be smooth (i.e. flat) or can be differently shaped, by including for example ribbing, knurling, alphanumeric characters, or the like, which will modify the finished tyre as described below.

Additionally, regardless of the shape of the contact surfaces of the moulding rings, the distance D shown in FIG. 2a, in other words the distance on a circumferential plane between the radially innermost end of the portion of the radially inner and axially inner surface 8a of the annular fixing structure 51a and the corresponding contact surface portion 33a of the bead moulding ring 60a, is preferably in the range from approximately 5 mm to approximately 40 mm, or more preferably in the range from approximately 7 mm to approximately 20 mm.

In a preferred embodiment, said elements 36 have a ribbed surface or a surface showing a pattern of any type only in the area in contact with the annular fixing structure of the green tyre 50.

Figure 14:
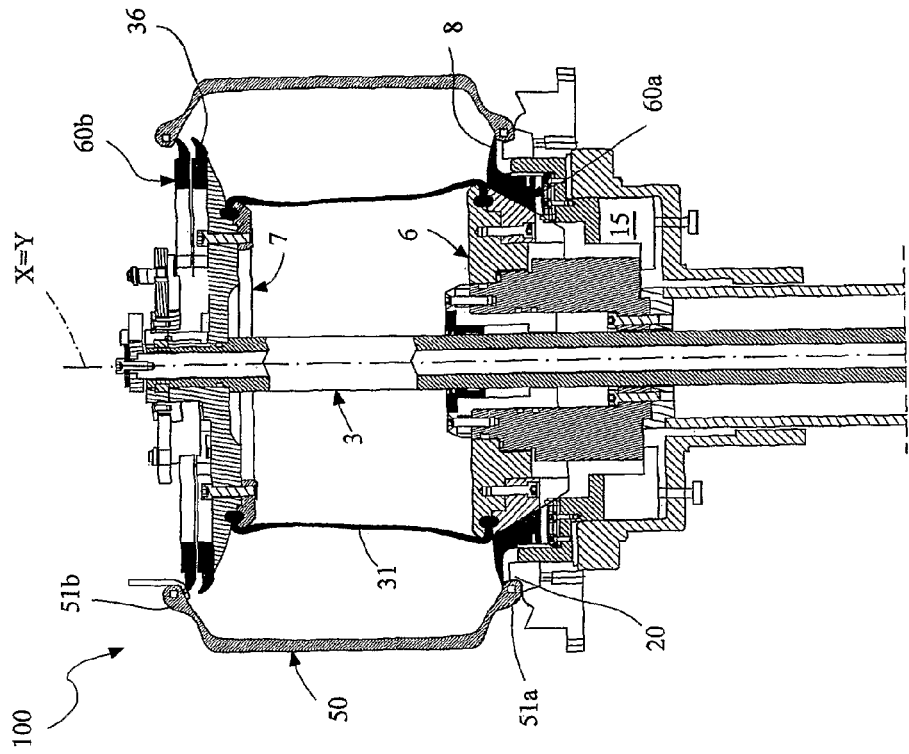

According to the method of the invention, in a configuration with the closing element 16 placed in the open position, with the inflatable bladder 30 in the deflated operating position, and with both of the bead moulding rings 60a, 60b contracted and therefore forming a diameter smaller than the diameter of the green tyre in a circumferential plane at the location of the annular fixing structure 51a, 51b, the green tyre 50 is positioned, for example by using a robotic arm using grippers, on the base 15 of the mould 200 in such a way that it is fitted into the central body 3 and the axis of rotation X of the green tyre 50, and the axis Y of the equipment 100 coincide. In this configuration which is shown in FIG. 14, the lower annular fixing structure 51a of the green tyre bears against the lower sidewall plate 20. The bead moulding ring 60a is housed inside the green tyre 50.

As mentioned above, the central body 3 is preferably telescopic, so that its height can be adjusted to match green tyres 50 of various sizes. It is then translated in such a way that the second plate 7 carrying the second bead moulding ring 60b is brought to the location of the upper annular fixing structure 51b. The travel of the telescopic body 3 is predetermined according to the axial dimension of the tyre 50.

Figure 15:
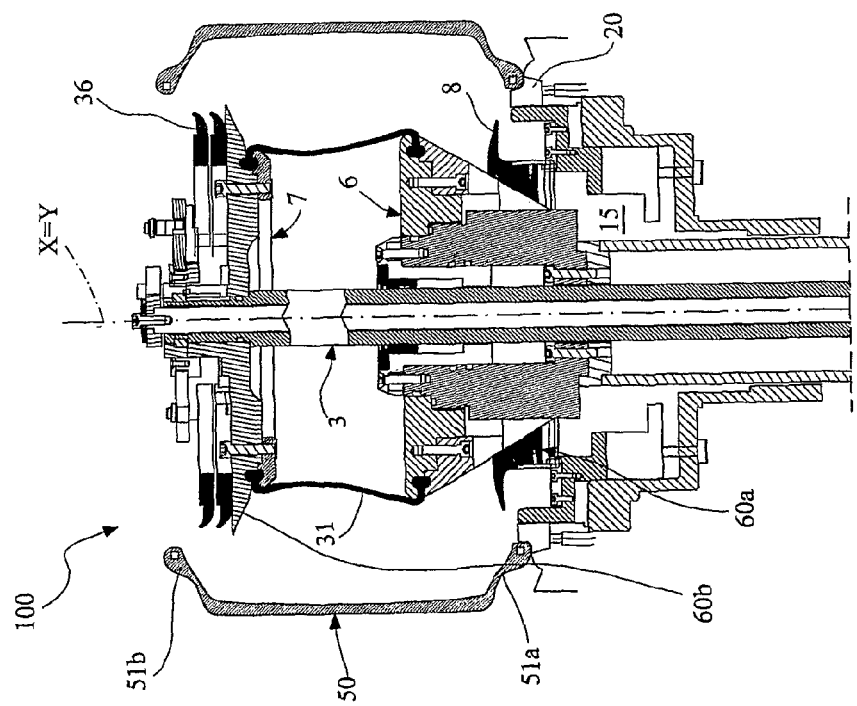

The lower and upper bead moulding rings 60a, 60b are then brought into the second expanded operating position, in which they form an extended contact surface 33a, 33b having a diameter greater than the diameter of the green tyre 50 at the location of the annular fixing structures 51a, 51b. The configuration reached in this step is shown in FIG. 15, in which each annular fixing structure 51a (51b) is delimited by two substantially opposed surfaces, in other words by the surface 31a (or 31b) of the sidewall plate 20 (21) and by the surface 33a (33b) of the bead moulding ring 60a (60b). This surface 33a (33b) can be in contact with the surface 8a (8b) of the bead 51a (51b) over a radial extension of 360° in the case in which it has the shape of a circumferential ring, or only at certain points, for a given radial extension according to the number of sectors 8', 8'', 8''' included in the bead moulding ring.

The bead moulding rings 60a, 60b are then translated towards the respective upper and lower sidewall plates 20, 21 so as to compress the two annular fixing structures 51a, 51b at a first squeezing pressure. As a result of this translation, each structure 51a, 51b comes into contact with and is correctly placed against the corresponding sidewall plate 20, 21, and the radially inner and axially inner surface portion 8a, 8b and the radially inner and axially outer surface portion 7a, 7b of each structure 51a, 51b are initially clamped and placed. The configuration reached in this step is shown in the sequence of FIGS. 16a and 16b, which show a detail of the moulding and curing equipment 100 on an enlarged scale. As mentioned above, the drawings show the annular fixing structure 51a (51b) locked and correctly brought into contact with the corresponding surfaces as a result of the translation of the bead moulding ring 60a (60b), and a first squeezing pressure is exerted on it as a result of the thrust of the ring towards the corresponding sidewall plate. This first pressure is preferably in the range from approximately 0.1 bar to approximately 5 bars. The aforesaid pressure is a specific pressure, in other words a pressure derived from the thrust provided by hydraulic cylinders, for example, on the bead moulding rings 60a, 60b.

Figure 17:
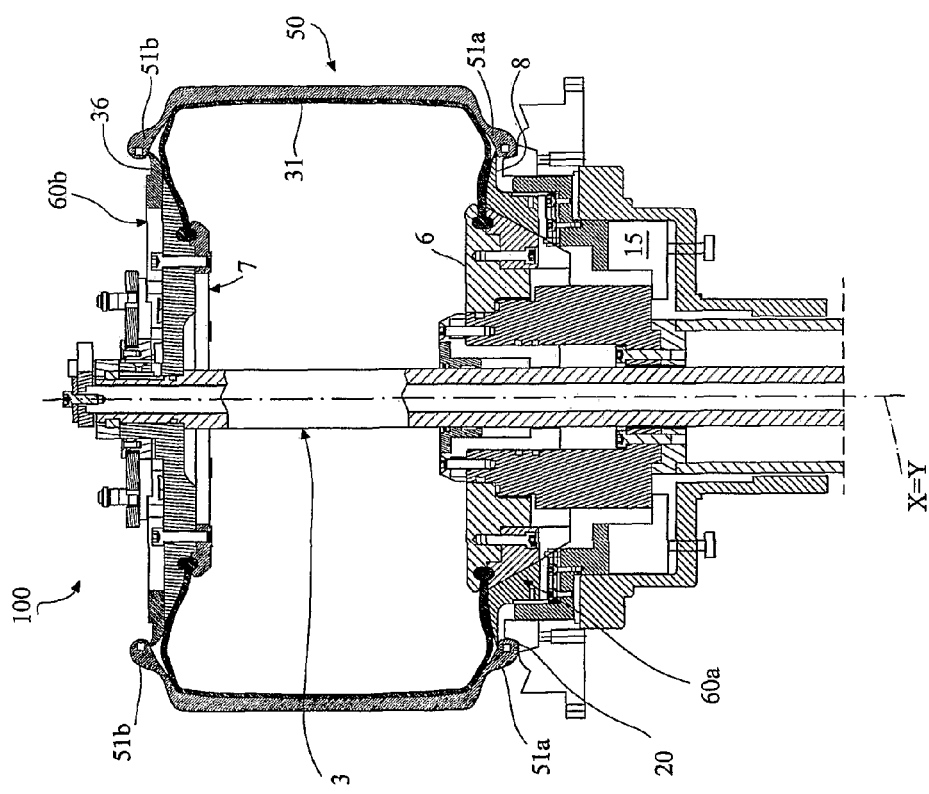

The bladder 30 is then inflated (this step being shown in FIGS. 16c and 17) by introducing steam, hot air or other heated fluid or gas through a passage which is not shown in the drawings, in order to keep the green tyre 50 substantially locked around the central body 3 and to prevent undesired movements of the tyre.

Figure 18:
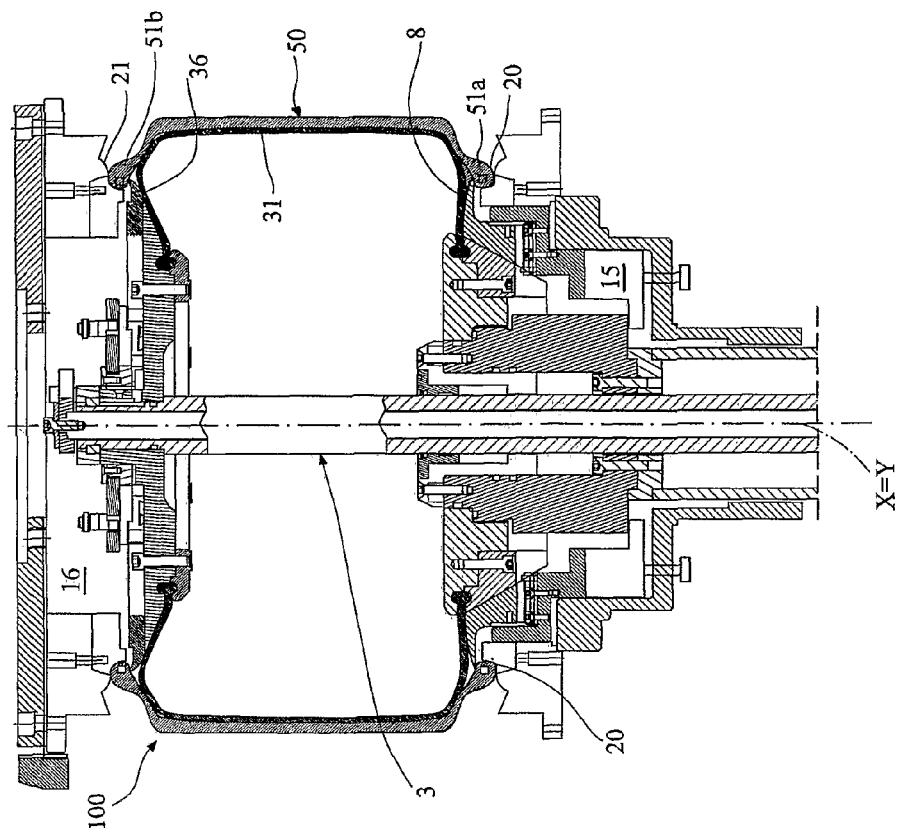

Preferably, the equipment 100 is still open during the initial inflation of the bladder 30 (FIG. 17), and subsequently, when a minimum pressure of the bladder 30 is reached, the equipment according to the invention 100 is closed by using the closing element 16, in such a way that the upper annular fixing structure 51b of the green tyre 50 bears against the upper sidewall plate 21 (see FIG. 18). The bladder 30 is then inflated until the second squeezing pressure of the annular fixing structures 51a, 51b is reached, the structures being "clamped" between the sidewall plates and the bead moulding rings, as described below. Preferably, said second squeezing pressure, also called the pre-moulding pressure, is greater than 0.2 bar and equal to or less than approximately 8 bars.

By using the pressure exerted by the bladder 30, the bead moulding ring 60a, 60b is further translated towards the corresponding sidewall plate 20, 21 in such a way that a greater pressure is exerted on the annular fixing structures 51a, 51b and the radially inner and axially inner surfaces 8a, 8b and the radially inner and axially outer surfaces 7a, 7b are then shaped, by "pre-moulding" (FIG. 16c).

It should be emphasized that, in this description and in the subsequent claims, each value of pressure due to direct fluid pressure is to be interpreted as a relative value of pressure with respect to atmospheric pressure.

Preferably, the pressure exerted by the bladder 30 on the annular fixing structures 51a, 51b increases from a minimum and then rises in a monotonic way until the moulding and curing pressure is reached. Alternatively, the pressure exerted by the bladder can rise substantially in a "stepped" way, in which the bladder is brought to the second squeezing pressure for a specified time interval. The second squeezing pressure is subsequently raised to the correct pressure for moulding and curing.

In this configuration, at the second squeezing pressure (FIG. 16c), a portion of the membrane 31 of the bladder 30 comes into contact with the second axially inner surface portion 8a, 8b of the lower and upper annular fixing structures 51a, 51b, thus pushing them outwards. As a result of the combined action of the bead moulding rings 60a, 60b, the sidewall plates 20, 21 and the membrane 31, the annular fixing structures 51a, 51b are shaped to the desired geometry.

In particular, the pressure exerted on each annular fixing structure 51a, 51b produces a modification of the shape with respect to the initial shape, in other words with respect to the shape of the green tyre 50 at the time of its insertion.

The expandable bladder 30 is kept at this second squeezing pressure for a period preferably in the range from approximately 2 to approximately 60 minutes, or more preferably from approximately 4 to approximately 40 minutes.

The fluid present in the expandable bladder 30 while the second pressure is exerted has a temperature preferably in the range from approximately 140° C. to approximately 210° C.

At the end of the period required for the pre-moulding operation, the expandable bladder 30 is raised to a higher pressure, in other words the moulding pressure, generally in the range from approximately 16 bars to approximately 28 bars, for the purpose of moulding and curing the green tyre 50.

At the end of the moulding and curing step, the bladder 30 is deflated and the equipment 100 is opened. The lower moulding ring 60a is brought to the contracted operating position, thus releasing the lower annular fixing structure 51a, and the central body 3 is translated, thus raising the tyre (FIG. 19). Subsequently, when the upper moulding ring 60b is contracted, the finished tyre 50' is removed and placed, for example, on a discharge roller conveyor 25 (FIG. 20).

A new green tyre 50 is fitted in the equipment 100, and the cycle described above by way of example is repeated.

Figures 11, 12, 13:
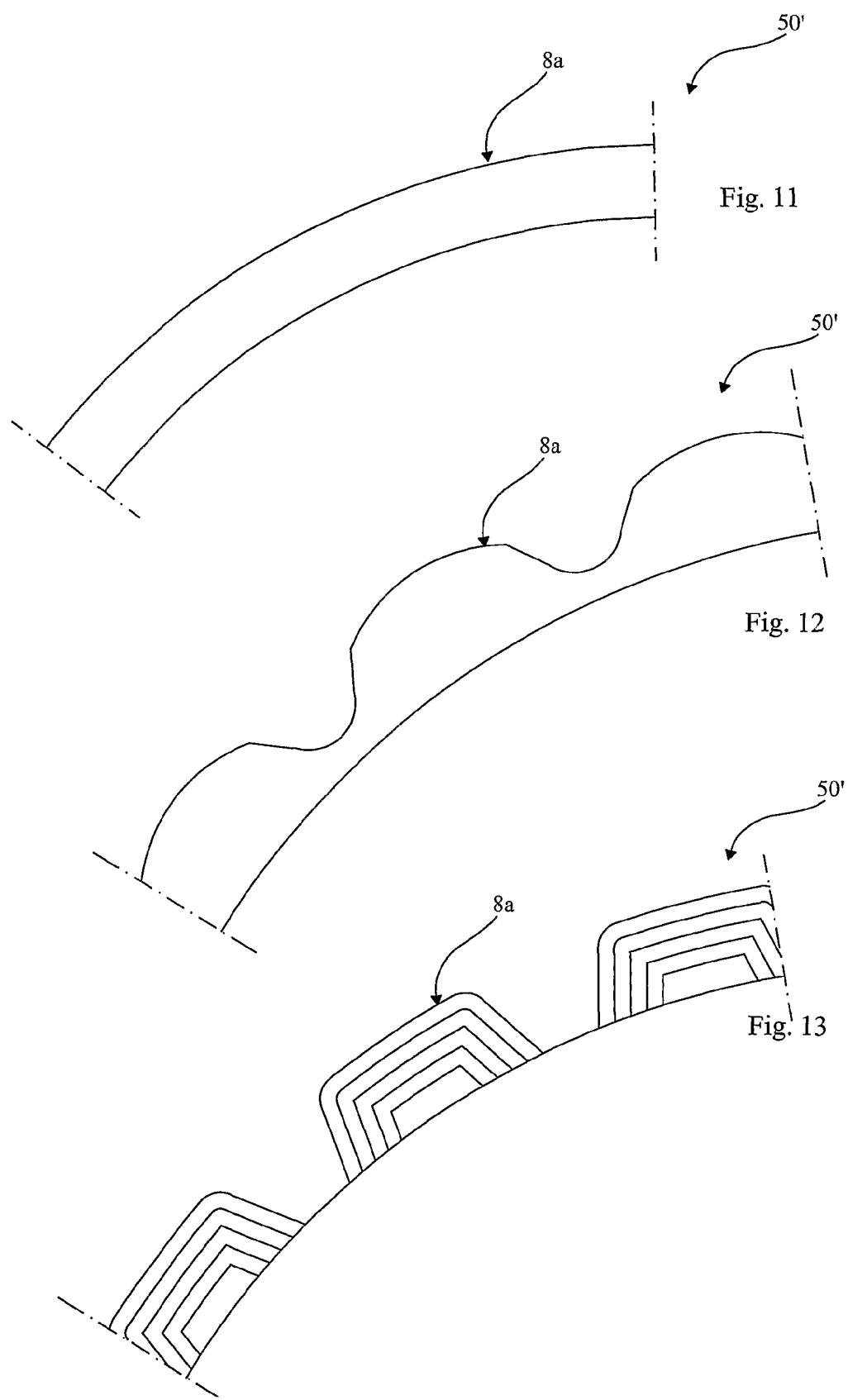
FIGS. 11 to 13 show simplified sectional side views of three different preferred examples of a tyre according to the present invention.

The finished tyre 50' has a specific shape of the annular fixing structures 51a, 51b, and in particular it has a specific shape of the radially inner and axially inner surfaces 8a, 8b, as shown in FIGS. 11 to 13, in which three different examples of embodiment of the aforementioned surfaces are shown schematically in cross section. In the drawings, only the surface 8a is indicated by a reference numeral, but identical details can be applied to the shape of the surface 8b.

In a first embodiment, in which the bead moulding rings in the expanded operating position form a contact surface 33a, 33b which is substantially in the form of a circular ring and flat, as in the preferred example of FIGS. 6 and 7, the corresponding surface of the annular fixing structure 8a, 8b is also flat, continuous, smooth and/or polished, as shown in cross section in FIG. 11.

In the case (not shown) in which this contact surface 33a, 33b is again shaped in the form of a continuous circular ring, but has a rough surface rather than a ribbed surface or one including alphanumeric characters, the same structure is reproduced on the surface 8a, 8b, with a "positive/negative" moulding effect.

On the other hand, in the case in which, as shown in the bead moulding rings of FIGS. 8-10, the contact surface 33a, 33b comprises a plurality of sub-surfaces which are separate even in the extended operating position, the resulting surface 8a, 8b of the annular fixing structure 51a, 51b also has an undulating structure as shown in cross section in FIG. 12, the number n of undulations depending on the number n of sub-surfaces included in the bead moulding ring.

The invention claimed is:

1. A method for controlling a phase of moulding an annular fixing structure of a green tyre, comprising:
    introducing said green tyre into a curing mould comprising an inflatable bladder;
    delimiting at least one portion of said annular fixing structure by using a first and a second surface opposed to each other;
    bringing said first surface and said second surface toward each other so as to bring a portion of said first surface and a portion of said second surface into contact with a corresponding axially inner surface portion and a corresponding axially outer surface portion, respectively, of said annular fixing structure, thereby generating a first squeezing pressure;
    inflating said inflatable bladder of said curing mould so as to bring said first surface and said second surface closer together, thereby generating a second squeezing pressure greater than said first squeezing pressure so as to shape said radially inner and axially inner surface portions and radially inner and axially outer surface portions of said annular fixing structure;
    maintaining said second squeezing pressure for at least 2 minutes; and
    further inflating said inflatable bladder to a third pressure, wherein said second squeezing pressure is maintained for less than 60 minutes
    wherein said second squeezing pressure is maintained for less than 60 minutes.

2. The method according to claim 1, wherein delimiting at least one portion of said annular fixing structure comprises radially extending said first surface from a first contracted position, whereby said first surface has a maximum diameter in a circumferential plane of said green tyre which is less than the diameter of said green tyre at the location of said annular fixing structure, to a second, expanded position, whereby said first surface has a maximum diameter in a circumferential plane of said green tyre which is greater than the diameter of said green tyre at the location of said annular fixing structure.

3. The method according to claim 2, wherein extending said first surface comprises radially extending at least two sub-surfaces, separate from each other, which extend angularly in said circumferential plane over a total angle of more than 18°.

4. The method according to claim 2, wherein extending said first surface comprises radially extending a plurality of sub-surfaces which, in the expanded operating position, generate a single continuous surface in the form of a circumferential ring.

5. The method according to claim 1, wherein the distance between a radially outermost point of said first surface and a radially innermost point of a corresponding radially inner and axially inner surface of said annular fixing structure projected on a circumferential plane is in a range from approximately 5 mm to approximately 40 mm.

6. The method according to claim 5, wherein said distance is in the range from approximately 7 mm to approximately 20 mm.

7. The method according to claim 1, wherein said first squeezing pressure is in a range from approximately 0.1 to approximately 5 bars.

8. The method according to claim 1, wherein said second squeezing pressure is greater than 0.2 bar and equal to or less than approximately 8 bars.

9. The method according to claim 1, wherein said mould comprises a first sidewall plate comprising said second surface for contacting said radially inner and axially outer surface portions of said annular fixing structure, and a first bead moulding ring comprising said first surface for contacting said radially inner and axially inner surface portion of said annular fixing structure.

10. The method according to claim 9, wherein delimiting at least one portion of said annular fixing structure comprises radially extending said bead moulding ring from a contracted operating position to an expanded operating position delimiting said portion of said annular fixing structure between said sidewall plate and said bead moulding ring.

11. The method according to claim 9, wherein bringing said first and said second surface toward each other comprises translating said first bead moulding ring toward said first sidewall plate.

12. The method according to claim 9, wherein inflating said inflatable bladder of said curing mould so as to bring said first surface and said second surface closer together comprises translating said first bead moulding ring further toward said first sidewall plate by compressing said first bead moulding ring by using said inflatable bladder.

13. A method according to claim 1 wherein bringing said first surface and said second surface toward each other includes translating in a radial direction said first surface toward said second surface.

14. The method according to claim 1, wherein said third pressure is in a range from approximately 16 bars to approximately 28 bars.

* * * * *

UNITED STATES PATENT AND TRADEMARK OFFICE
CERTIFICATE OF CORRECTION

PATENT NO. : 8,828,168 B2  
APPLICATION NO. : 13/057253  
DATED : September 9, 2014  
INVENTOR(S) : Piantanida et al.

Page 1 of 1

It is certified that error appears in the above-identified patent and that said Letters Patent is hereby corrected as shown below:

In the Claims

Claim 1, column 15, lines 38-39, delete first instance of "wherein said second squeezing pressure is maintained for less than 60 minutes".

Signed and Sealed this  
Tenth Day of March, 2015

Michelle K. Lee  
*Deputy Director of the United States Patent and Trademark Office*